United States Patent
Liu et al.

(10) Patent No.: US 9,647,734 B2
(45) Date of Patent: May 9, 2017

(54) LARGE-SCALE FADING COEFFICIENT ESTIMATION IN WIRELESS MASSIVE MIMO SYSTEMS

(71) Applicant: MEDIATEK Singapore Pte. Ltd., Singapore (SG)

(72) Inventors: Yen-Cheng Liu, New Taipei (TW); Ko-Feng Chen, New Taipei (TW); York Ted Su, Chia-Yi (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 215 days.

(21) Appl. No.: 14/539,212

(22) Filed: Nov. 12, 2014

(65) Prior Publication Data
US 2015/0131580 A1    May 14, 2015

Related U.S. Application Data

(60) Provisional application No. 61/904,076, filed on Nov. 14, 2013.

(51) Int. Cl.
*H04W 4/00* (2009.01)
*H04B 7/0452* (2017.01)
*H04L 25/02* (2006.01)

(52) U.S. Cl.
CPC ......... *H04B 7/0452* (2013.01); *H04L 25/022* (2013.01); *H04L 25/0204* (2013.01); *H04L 25/0228* (2013.01); *H04L 25/0242* (2013.01)

(58) Field of Classification Search
CPC .. H04B 7/0452; H04B 7/0413; H04B 7/0626; H04B 7/0417; H04B 7/0632;
(Continued)

(56) References Cited

U.S. PATENT DOCUMENTS

2007/0058590 A1*   3/2007   Wang ................... H04B 7/0632   370/334
2008/0101437 A1   5/2008   Janani et al. ................. 375/131
(Continued)

FOREIGN PATENT DOCUMENTS

CN    101523735 A    10/2006
CN    101621813 A     7/2009
(Continued)

OTHER PUBLICATIONS

The Multicell Multiuser MIMO Uplink with Very Large Antenna Arrays and a Finite-Dimensional Channel Hien Quoc Ngo, Student Member, IEEE, Erik G. Larsson, Senior Member, IEEE, and Thomas L. Marzetta, Fellow, IEEE.*

(Continued)

*Primary Examiner* — Chi H Pham
*Assistant Examiner* — Lionel Preval
(74) *Attorney, Agent, or Firm* — Imperium Patent Works; Zheng Jin

(57) ABSTRACT

Efficient algorithms for estimating LSFCs with no aid of SSFCs by taking advantage of the channel hardening effect and large spatial samples available to a massive MIMO base station (BS) are proposed. The LSFC estimates are of low computational complexity and require relatively small training overhead. In the uplink direction, mobile stations (MSs) transmit orthogonal uplink pilots for the serving BS to estimate LSFCs. In the downlink direction, the BS transmits either pilot signal or data signal intended to the MSs that have already established time and frequency synchronization. The proposed uplink and downlink LSFC estimators are unbiased and asymptotically optimal as the number of BS antennas tends to infinity.

20 Claims, 10 Drawing Sheets

METHOD OF LSFC ESTIMATION IN UPLINK MASSIVE MIMO CHANNEL

(58) Field of Classification Search
CPC ...... H04B 7/024; H04W 24/02; H04W 72/04; H04L 25/0202; H04L 25/0224; H04L 25/0242
USPC .................................. 370/329, 334; 375/267
See application file for complete search history.

(56) References Cited

U.S. PATENT DOCUMENTS

| | | | |
|---|---|---|---|
| 2008/0130674 A1 | 6/2008 | Ahmed-Ouameur et al. ............................ | 370/441 |
| 2011/0058632 A1 | 3/2011 | Siti et al. ....................... | 375/340 |
| 2013/0070621 A1 | 3/2013 | Marzetta et al. ............. | 370/252 |
| 2016/0197658 A1* | 7/2016 | Jindal ............... | H04L 25/03898 375/267 |

FOREIGN PATENT DOCUMENTS

| | | |
|---|---|---|
| CN | 10223327 A | 7/2011 |
| EP | 2293483 A2 | 9/2009 |

OTHER PUBLICATIONS

International Search Report and Written Opinion of International Search Authority for PCT/CN2014/091148 dated Feb. 17, 2015 (13 pages).

Ngo, Hien Quaoc et al.; The Multicell Multiuser MIMO Uplink with Very Large Antenna Arrays and a Finite-Dimensional Channel IEEE Transactions on Communications, Jun. 30, 2013 vol. 61 No. 6; p. 2350 left column; p. 2351 left column paragraph 1, right column paragraphs 3-4; p. 2352 right column; p. 2354 left column paragraph 2; p. 2360 left column paragraph 1.

Chen, Ko-Feng et al.; On Composite Channel Estimation in Wireless Massive MIMO Systems Globecom 2013 workshop—Emerging Technologies for LTE—Advanced and Beyong—4G; Dec. 13, 2013 sections II-III.

EPO, Search Report for the EP patent application 14861915.8 dated Dec. 20, 2016 (9 pages).

Ko-Feng Chen et al., On Composite Channel Estimation in Wireless Massive MIMO Systems, Globecom 2013 Workshop—Emerging Technologies for LTE-Advanced and Beyong-4G (5 pages).

Fredrik Rusek et al., Scaling Up MIMO: Opportunities and Challenges with Very Large Arrays, IEEE Signal Porcessing Magazine, Jan. 2013 (21 pages).

Hien Quoc Ngo et al., Energy and Spectral Efficiency of Very Large Multiuser MIMO Systems, IEEE Transactions on Communications, vol. 61, No. 4, Apr. 2013 (14 pages).

\* cited by examiner

METHOD OF LSFC ESTIMATION IN UPLINK MASSIVE MIMO CHANNEL

LARGE-SCALE FADING COEFFICIENT ESTIMATION IN WIRELESS MASSIVE MIMO SYSTEMS

CROSS REFERENCE TO RELATED APPLICATIONS

This application claims priority under 35 U.S.C. §119 from U.S. Provisional Application No. 61/904,076, entitled "Large-Scale Fading Coefficient Estimation in Wireless Massive MIMO Systems," filed on Nov. 14, 2013, the subject matter of which is incorporated herein by reference.

TECHNICAL FIELD

The disclosed embodiments relate generally to wireless network communications, and, more particularly, to large-scale fading coefficient estimation for wireless massive multi-user multiple-input multiple-output (MU-MIMO) systems.

BACKGROUND

A cellular mobile communication network in which each serving base station (BS) is equipped with an M-antenna array, is referred to as a large-scale multiuser multiple-input multiple-output (MIMO) system or a massive MIMO system if M>>1 and M>>K, where K is the number of active user antennas within its serving area. A massive MIMO system has the potential of achieving transmission rate much higher than those offered by current cellular systems with enhanced reliability and drastically improved power efficiency. It takes advantage of the so-called channel-hardening effect that implies that the channel vectors seen by different users tend to be mutually orthogonal and frequency-independent. As a result, linear receiver is almost optimal in the uplink and simple multiuser pre-coders are sufficient to guarantee satisfactory downlink performance.

To achieve such performance, channel state information (CSI) is needed for a variety of link adaptation applications such as precoder, modulation and coding scheme (SCM) selection. CSI in general includes large-scale fading coefficients (LSFCs) and small-scale fading coefficients (SSFCs). LFCSs summarize the pathloss and shadowing effects, which are proportional to the average received-signal-strength (RSS) and are useful in power control, location estimation, handover protocol, and other application. SSFCs, on the other hand, characterize the rapid amplitude fluctuations of the received signal. While all existing MIMO channel estimation focus on the estimation of the SSFCs and either ignore or assume perfect known LFCSs, it is desirable to know SSFCs and LSFCs separately. This is because LSFCs can not only be used for the aforementioned applications, but also be used for the accurate estimation of SSFCs.

LSFCs are long-term statistics whose estimation is often more time-consuming than SSFCs estimation. Conventional MIMO CSI estimation usually assume perfect LSFC information and deal solely with SSFCs. For co-located MIMO systems, it is reasonable to assume that the corresponding LSFCs remain constant across all spatial sub-channels and the SSFC estimation can sometime be obtained without the LSFC information. Such assumption is no longer valid in a multiuser MIMO system, where the user-BS distances spread over a large range and the SSFCs cannot be derived without the knowledge of LSFCs.

In the past, the estimation of LSFC has been largely neglected, assuming somehow perfectly known prior to SSFC estimation. When one needs to obtain a joint LSFC and SSFC estimate, the minimum mean square error (MMSE) or least squares (LS) criterion is not directly applicable. The expectation-maximization (EM) approach is a feasible alternate but it requires high computational complexity and convergence is not guaranteed. A solution for efficiently estimating LSFCs with no aid of SSFCs is sought in a massive multiuser MIMO system.

SUMMARY

Efficient algorithms for estimating LSFCs with no aid of SSFCs by taking advantage of the channel hardening effect and large spatial samples available to a massive MIMO base station (BS) are proposed. The LSFC estimates are of low computational complexity and require relatively small training overhead. In the uplink direction, mobile stations (MSs) transmit orthogonal uplink pilots for the serving BS to estimate LSFCs. In the downlink direction, the BS transmits either pilot signal or data signal intended to the MSs that have already established time domain and frequency domain synchronization. The proposed uplink and downlink LSFC estimators are unbiased and asymptotically optimal as the number of BS antennas tends to infinity.

In one embodiment, a base station (BS) receives radio signals transmitted from K mobile stations (MSs) in a massive MIMO uplink channel where M>>K. The BS vectorizes the received radio signals denoted as a matrix Y∈ $\mathbb{C}^{M \times T}$. The transmitted radio signals are orthogonal pilot signals denoted as a matrix P∈$\mathbb{C}^{K \times T}$ transmitted from the K MSs, and T≥K is the pilot signal length. The BS derives an estimator of large-scale fading coefficients (LSFCs) of the uplink channel without knowing small-scale fading coefficients (SSFCs) of the uplink channel. The BS may also receive pilot signals that are transmitted for J times over coherent radio resource blocks from the K MS. The BS then derives a more accurate estimator of the LSFCs of the uplink channel based on the multiple pilot transmissions. In addition, the BS calculates element-wise expression of the LSFCs for each of the kth uplink channel based on the LSFCs estimator.

In another embodiment, a mobile station (MS) receives radio signals transmitted from a base station (BS) having M antennas in a massive MIMO system. The transmitted radio signals are denoted as a matrix Q transmitted from the BS to K MS and M>>K. The MS determines a received radio signal denoted as a vector $x_k$ received by the MS that is the kth MS associated with a $k^{th}$ downlink channel. The $k^{th}$ MS derives an estimator of a large-scale fading coefficient (LSFC) of the $k^{th}$ downlink channel without knowing a small-scale fading coefficient (SSFC) of the kth downlink channel. In a semi-blind LSFC estimation, matrix Q is a semi-unitary matrix consisting of orthogonal pilot signals, and the LSFC of the $k^{th}$ downlink channel is derived based on $x_k$ and the transmitting power of the pilot signals. In a blind LSFC estimation, matrix Q represents pre-coded data signals transmitted to K' MS that are different from the K MS. The LSFC of the $k^{th}$ downlink channel is derived based on $x_k$ and the transmitting power of the data signals with unknown data information and unknown beamforming or precoding information.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Notation: $(.)^T$, $(.)^H$, $(.)^*$ represent the transpose, conjugate transpose, and conjugate of the enclosed items, respectively, vec(.) is the operator that forms one tall vector by stacking columns of the enclosed matrix, whereas Diag(.) translate a vector into a diagonal matrix with the vector entries being the diagonal terms. While $E\{.\}$, $\|.\|$, and $\|.\|_F$, denote the expectation, vector $l_2$-norm, and Frobenius norm of the enclosed items, respectively, $\otimes$ and $\odot$ respectively denote the Kronecker and Hadamard product operator. Denoted by $I_L$, $1_L$, and $0_L$ respectively, are the (L×L) identity matrix, L-dimensional all-one and all-zero column vectors, whereas $1_{L\times S}$ and $0_{L\times S}$ are the matrix counterparts of the latter two. Almost surely convergence is denoted by $$\xrightarrow{a.s.}$$

and the Kronecker delta function denoted by $$\delta_{ij} \stackrel{def}{=} \begin{cases} 0, & i \neq j \\ 1, & i = j \end{cases}.$$

Figure 1:
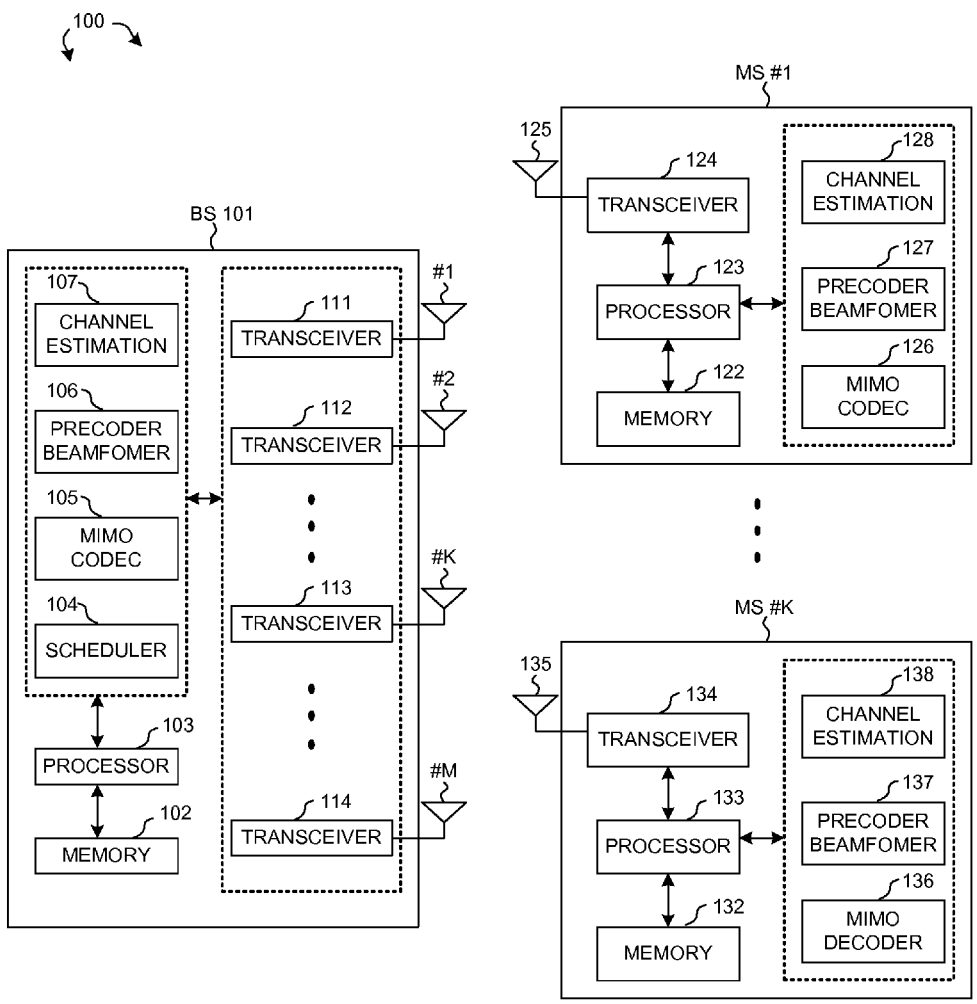
FIG. 1 illustrates simplified block diagrams of a base station and a plurality of mobile stations in a single-cell massive MU-MIMO system in accordance with one novel aspect.

FIG. 1 illustrates simplified block diagrams of a base station and a plurality of mobile stations in a single-cell massive MU-MIMO system 100 in accordance with one novel aspect. Massive MU-MIMO system 100 comprises a base station BS 101 having an M-antenna array and K single-antenna mobile stations MS #1 to MS #K, wherein M>>K. For a multi-cell uplink system, pilot contamination may become a serious design concern in the worst case when the same pilot sequences (i.e., the same pilot symbols are place at the same time-frequency locations) happen to be used simultaneously in several neighboring cells and are perfectly synchronized in both carrier and time. In practice, there are frequency, phase, and timing offset between any pair of pilot signals and the number of orthogonal pilots is often sufficient to serve mobile users in multiple cells. Moreover, neighbor cells may use the same pilot sequence but the pilot symbols are located in non-overlapping time-frequency units, hence a pilot sequence is more likely be interfered by uncorrelated asynchronous data sequence whose impact is not as serious as the worst case and can be mitigated by proper inter-cell coordination, frequency planning and some interference suppression techniques. Throughout the present application, the discussion will be focused on the single-cell narrowband scenario. The proposed method, however, is not limited thereto.

In the example of FIG. 1, BS 101 comprises memory 102, a processor 103, a scheduler 104, a MIMO codec 105, a precoder/beamformer 106, a channel estimator 107, and a plurality of transceivers coupled to a plurality of antennas. Similarly, each MS comprises memory, a processor, a MIMO codec, a precoder/beamformer, a channel estimator, and a transceiver couple to an antenna. Each wireless device receives RF signals from the antenna, converts them to baseband signals and sends them to the processor. Each RF transceiver also converts received baseband signals from the processor, converts them to RF signals, and sends out to the antenna. For example, processor 103 processes the received baseband signals and invokes different functional modules to perform features in the device. Memory 102 stores program instructions and data to control the operations of the device. The functional modules carry out embodiments of the current invention. The functional modules may be configured and implemented by hardware, firmware, software, or any combination thereof.

Figure 2:
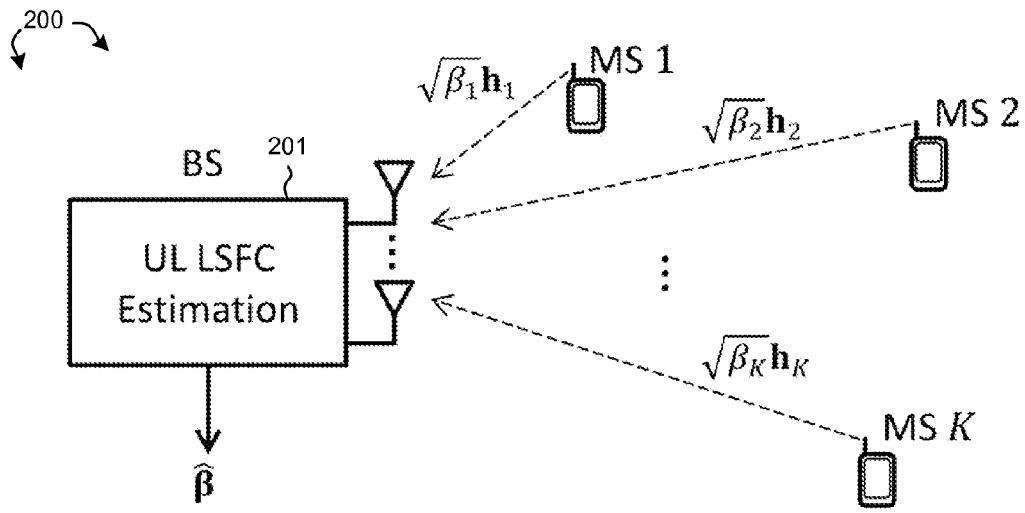
FIG. 2 is an exemplary diagram illustrating an uplink MIMO system in accordance with one novel aspect.

FIG. 2 is an exemplary diagram illustrating an uplink MIMO system 200 in accordance with one novel aspect. MIMO system 200 comprises a base station BS 201 having M antennas, and K mobile stations MS 1 to MS K. In the uplink direction, each $k^{th}$ MS transmits pilot training signals $p_k$ to be received by BS 201 via M antennas. We assume a narrowband communication environment in which a transmitted signal suffers from both large-scale and small-scale fading. The large-scale fading coefficients (LSFCs) for each uplink channel is denoted as $\beta_k$'s, while the small-scale fading coefficients (SSFCs) for each uplink channel is denoted as $h_k$'s. The K uplink packets place their pilot of length T at the same time-frequency location so that, without loss of generality, the corresponding received signals, arranged in matrix form, $Y \in \mathbb{C}^{M \times T}$ at the BS can be expressed as:

$$Y = \sum_{k=1}^{K} \sqrt{\beta_k} h_k p_k^H + N = HD_\beta^{1/2} P + N$$

where
- $H=[h_1, \ldots, h_K] \in \mathbb{C}^{M \times K}$ contains the SSFCs that characterize the K uplink channels, $h_k = \Phi_k^{1/2} \tilde{h}_k$, $\tilde{h}_k \sim CN(0_M, I_M)$, where $\Phi_k$ is the spatial correlation matrix at the BS side with respect to the $k^{th}$ user
- $D_\beta = \text{Diag}(\beta_1, \ldots, \beta_K)$ contains the LSFCs that characterize the K uplink channels, vector $\beta=[(\beta_1, \ldots, \beta_K)^T]$ whose elements $\beta_k = s_k d_k^{-\alpha}$ describes the shadowing effect, parameterized by independent identically distributed (i.i.d) $s_k$'s with $\log_{10}(s_k) \sim N(0, \sigma_s^2)$, and the pathloss which depends on the distance between the BS and MS $d_k$, with $\alpha>0$
- $P=[p_1, \ldots, p_K]^H \in \mathbb{C}^{K \times T}$ is the K×T matrix where M>>T≥K and $p_k$ is the pilot sequence sent by MS k and $p_j^H p_k = 0$, $\forall j \neq k$ (orthogonal pilot sequences)
- $N=[n_{ij}]$, $n_{ij} \sim CN(0,1)$ is the noise matrix whose entries are distributed according to CN(0,1).

We invoke the assumption that independent users are relatively far apart (with respect to the wavelength) and the $k^{th}$ uplink channel vector is independent of the $l^{th}$ vector, $\forall l \neq k$. We assume that $\tilde{h}_k$ are i.i.d. and the SSFC H remains constant during a pilot sequence period, i.e., the channel's coherence time is greater than T, while the LSFC $\beta$ varies much slower.

Unlike most of the existing works that focus on the estimation of the composite channel matrix $HD_\beta^{1/2}$, or equivalently, ignore the LSFC, it is beneficial for system performance to know H and $D_\beta^{1/2}$ separately. Even though the decoupled treatment of LSFCs and SSFCs has been seen recently, the assumption that the former is well known is usually made. In ordinary MIMO systems, MMSE or LS criterion cannot be used directly to jointly estimate LSFC and SSFC owing to their coupling, and EM algorithm is a feasible alternative. However, EM has high computational complexity and convergence is not guaranteed. In accordance with one novel aspect, a timely accurate LSFC estimator for uplink massive MIMO without the prior knowledge of SSFC is proposed.

Figure 3:
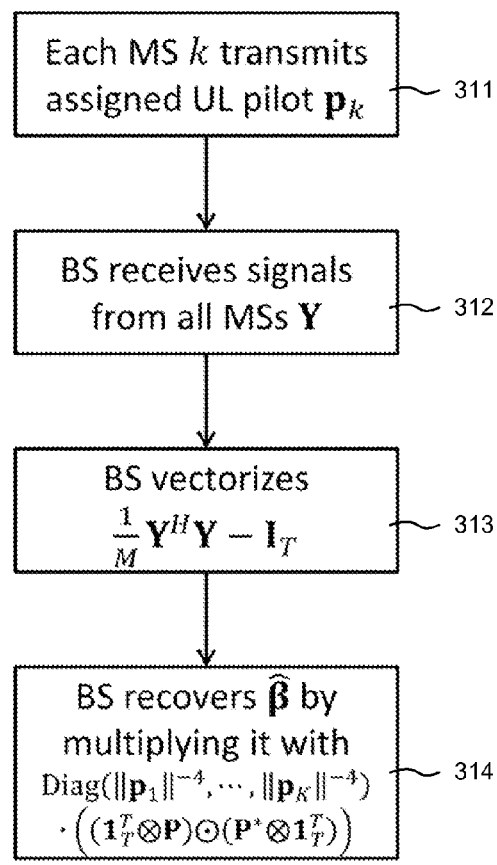
FIG. 3 is a flow chart of an uplink LSFC estimator that estimates all accessing MSs' LSFCs simultaneously in a massive MIMO system.

FIG. 3 is a flow chart of an uplink LSFC estimator that estimates all accessing MSs' LSFCs simultaneously in a massive MIMO system 200 of FIG. 2. In step 311, each MS k transmits assigned UL pilot $p_k$. In step 312, the BS receives pilot signals transmitted from all K MSs, which becomes the received signals denoted as Y. In step 313, the BS vectorizes $$\frac{1}{M} Y^H Y - I_T.$$

Finally, in step 314, the BS derives an estimator of LSFC $\hat{\beta}$ by multiplying it with $\text{Diag}(\|p_1\|^{-4}, \ldots, \|p_K\|^{-4}) \cdot ((1_T^T \otimes P) \odot (P^* \otimes 1_T^T))$. The derivation of LSFC $\hat{\beta}$ is as follows:

$$\frac{1}{M} Y^H Y - I_T = \frac{2}{M} \Re\{P^H D_\beta^{1/2} H^H N\} + P^H D_\beta P + \quad (1)$$

$$P^H D_\beta^{\frac{1}{2}} \left(\frac{1}{M} H^H H - I_K\right) D_\beta^{\frac{1}{2}} P + \frac{1}{M} N^H N - I_T$$

$$\xrightarrow{a.s} P^H D_\beta P$$

$$\text{vec}\left(\frac{1}{M} Y^H Y - I_T\right) \xrightarrow{a.s} ((1_T \otimes P^H) \odot (P^T \otimes 1_T))\beta$$

$$\hat{\beta} = \text{Diag}(\|p_1\|^{-4}, \ldots, \|p_K\|^{-4}) \cdot$$

$$((1_T^T \otimes P) \odot (P^* \otimes 1_T^T)) \cdot \text{vec}\left(\frac{1}{M} Y^H Y - I_T\right)$$

where due to the large number of BS antennas M, the large sample size of the receive signal shows the following convergence:

$$H = [h_1, \ldots, h_K] = [h_{ik}], N = [n_1, \ldots, n_T] = [n_{ij}];$$

$$H^H N \xrightarrow{a.s.} 0_{K \times T}: \text{Because when } M \to \infty,$$

$$h_k^H n_j = \sum_{i=1}^{M} h_{ik}^* n_{ij} \approx M \cdot E\{h_{ik}^* n_{ij}\} = 0.$$

$$\frac{1}{M} H^H H - I_K \xrightarrow{a.s.} 0_{K \times K}: \text{Because when } M \to \infty,$$

$$\frac{1}{M} h_k^H h_j = \frac{1}{M} \sum_{i=1}^{M} h_{ik}^* h_{ij} \approx \frac{1}{M} E\{h_{ik}^* h_{ij}\} = \delta_{kj}.$$

$$\frac{1}{M} N^H N - I_T \xrightarrow{a.s.} 0_{T \times T}: \text{Because when } M \to \infty,$$

$$\frac{1}{M} n_k^H n_j = \frac{1}{M} \sum_{i=1}^{M} n_{ik}^* n_{ij} \approx \frac{1}{M} E\{n_{ik}^* n_{ij}\} = \delta_{kj}.$$

By exploiting the properties of massive MIMO, the proposed LFSC estimator has low computational complexity while outperform the one derived from EM algorithm. The proposed LFSC estimator is of low complexity, as no matrix inversion is needed when orthogonal pilots are used and does not require any knowledge of SSFCs. Furthermore, the configuration of massive MIMO makes the estimator robust against noise.

Figure 4A:
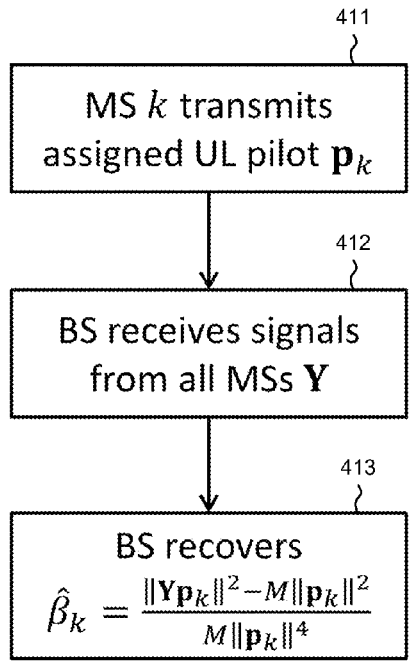
FIG. 4A is a flow chart of an uplink LSFC estimator that estimates the LSFC for each accessing MS individually in a massive MIMO system.

FIG. 4A is a flow chart of an uplink LSFC estimator that estimates the LSFC for each accessing MS individually in a massive MIMO system 200 of FIG. 2. In step 411, each MS k transmits assigned UL pilot $p_k$. In step 412, the BS receives pilot signals from all K MSs, denoted as Y. In step 413, $\hat{\beta}=[\hat{\beta}_1, \ldots, \hat{\beta}_K]$ is decoupled as, $\forall k$, and the BS derives an estimator of each LSFC $\hat{\beta}_k$ for each uplink channel to be:

$$\hat{\beta}_k = \frac{p_k^H Y^H Y p_k - M\|p_k\|^2}{M\|p_k\|^4} \quad (2)$$

Figure 4B:
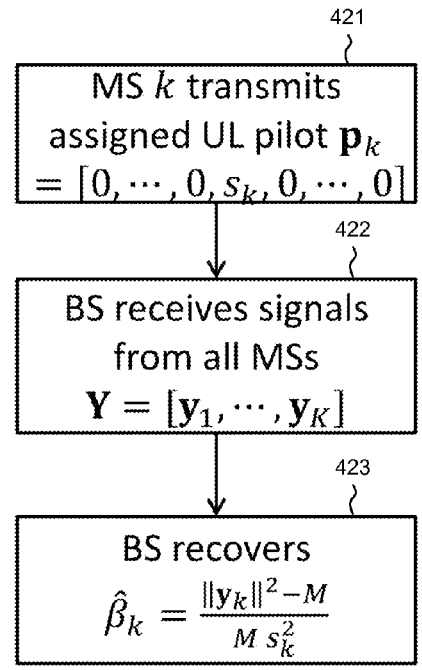
FIG. 4B is a flow chart of an uplink LSFC estimator that estimates the LSFC for each accessing MS individually using a row of a diagonal matrix as pilot in a massive MIMO system.

FIG. 4B is a flow chart of an uplink LSFC estimator that estimates the LSFC for each accessing MS individually using a row of a diagonal matrix as pilot in a massive MIMO system 200 of FIG. 2. In step 421, each MS k transmits assigned UL pilot $p_k$. In the example of FIG. 4B, the pilot is chosen to be a row of diagonal matrix, i.e., P=Diag($s_1, \ldots, s_K$) and T=K, where each pilot sequence $p_k=[0, \ldots, 0, s_k, 0, \ldots 0]$. In step 422, the BS receives pilot signals from all K MSs, denoted as Y, where Y=$[y_1, \ldots, y_K]$. In step 423, the BS decouples the LSFC estimator $\hat{\beta}_k$ for each uplink channel to be:

$$\hat{\beta}_k = \frac{\|y_k\|^2 - M}{M s_k^2} \quad (3)$$

This estimator coincides with our prediction that the instantaneous received signal strength minus the noise power, $\|y_k\|^2 - M$, is approximately equal to the strength of the desired signal and thus fairly reflects the gain provided by large-scale fading if it is divided by M $s_k^2$, the total power emitted by user k ($s_k^2$) times the number of copies received at the BS (M).

Figure 5:
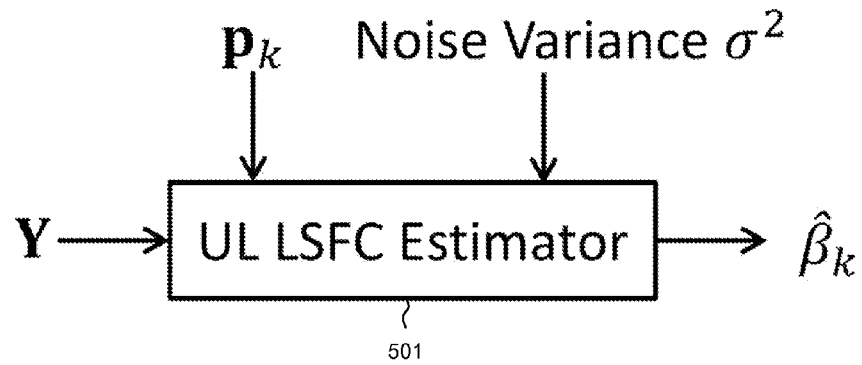
FIG. 5 shows an exemplary schematic view of an uplink LSFC estimator in a massive MIMO system.

FIG. 5 shows an exemplary schematic view of an uplink LSFC estimator 501 in a massive MIMO system 200 of FIG. 2. In the example of FIG. 5, a base station having M antennas receives radio signal Y from K mobile stations MSs, each MS k transmits a pilot sequence $p_k$, and the noise variance is $\sigma^2$. The UL LSFC estimator 501 is able to derive the LSFC $\hat{\beta}_k$ for each uplink channel with low computational complexity and without prior knowledge of the small-scale fading coefficients.

Figure 6:
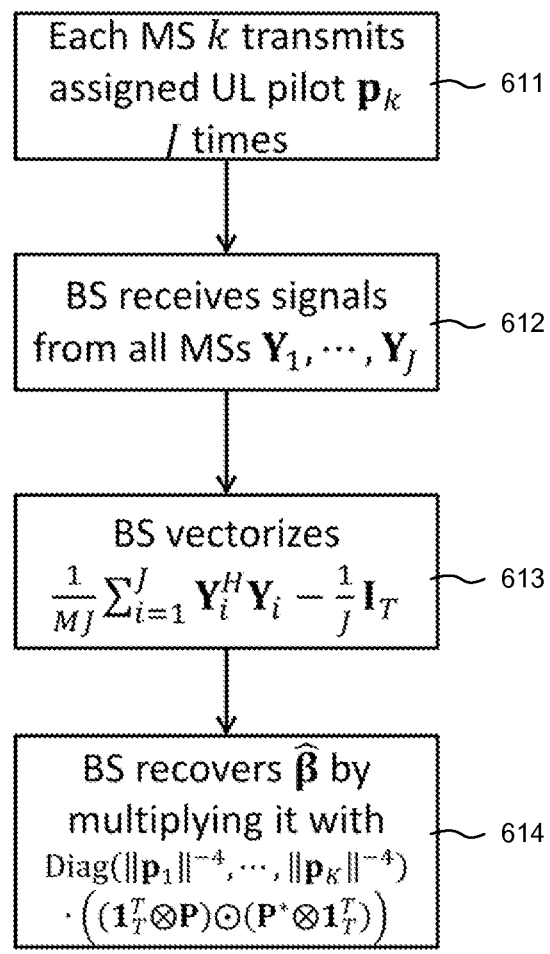
FIG. 6 is a flow chart of an uplink LSFC estimator that estimates all accessing MSs' LSFCs simultaneously with multiple pilot transmissions in a massive MIMO system.

FIG. 6 is a flow chart of an uplink LSFC estimator that estimates all accessing MSs' LSFCs simultaneously with multiple pilot transmissions in a massive MIMO system 200 of FIG. 2. In step 611, each MS k transmits assigned UL pilot $p_k$ J times. The J-time pilot transmissions can be achieved in different ways. In one example, the MS may transmit the pilot $p_k$ by repeating the transmission J times in time domain. In another example, the MS may transmit the pilot $p_k$ by repeating the transmission J times in frequency domain. Note that, in our example, although the $ip_k$ remains the same during the J transmissions, different $p_k$ can be used for each of the different transmissions. In step 612, the BS receives pilot signals from all K MSs, denoted as $Y_1, \ldots, Y_J$, where $Y_i$ is the $i^{th}$ received signal block at the BS. In step 613, the BS vectorizes $$\frac{1}{MJ} \sum_{i=1}^{J} Y_i^H Y_i - \frac{1}{J} I_T.$$

Finally, in step 614, the BS derives an estimator of LSFC $\hat{\beta}$ by multiplying it with Diag($\|p_1\|^{-4}, \ldots, \|p_K\|^{-4}$)·$((1_T^T \otimes P) \odot (P^* \otimes 1_T^T))$. If the J coherent resource blocks on time-frequency domain in which the LSFCs remain constant are available, then we have:

$$\hat{\beta} = \text{Diag}(\|p_1\|^{-4}, \ldots, \|p_K\|^{-4}) \cdot \quad (4)$$
$$((1_T^T \otimes P) \odot (P^* \otimes 1_T^T)) \cdot vec\left( \frac{1}{MJ} \sum_{i=1}^{J} Y_i^H Y_i - \frac{1}{J} I_T \right)$$

Figure 7A:
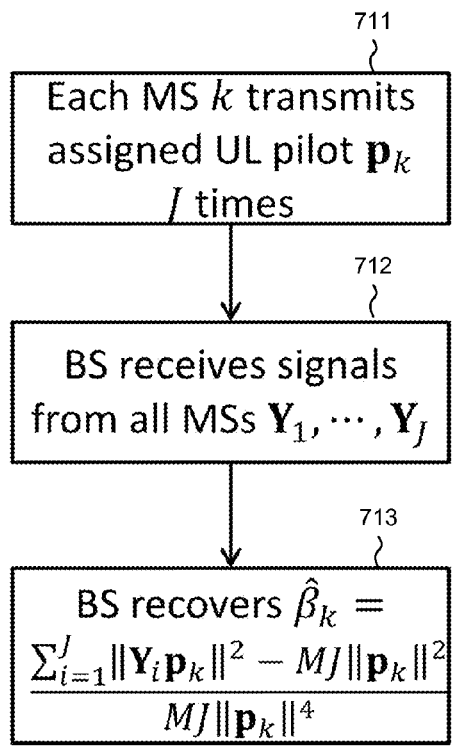
FIG. 7A is a flow chart of an uplink LSFC estimator that individually estimates the LSFC for each MS with multiple pilot transmissions in a massive MIMO system.

FIG. 7A is a flow chart of an uplink LSFC estimator that individually estimates the LSFC for each MS with multiple pilot transmissions in a massive MIMO system 200 of FIG. 2. In step 711, each MS k transmits assigned UL pilot $p_k$ J times. In step 712, the BS receives pilot signals from all K MSs, denoted as $Y_1, \ldots, Y_J$. In step 713, $\hat{\beta}_k$ is decoupled from $\hat{\beta}=[\hat{\beta}_1, \ldots, \hat{\beta}_K]$, $\forall k$, and the BS derives an estimator of each LSFC $\hat{\beta}_k$ for each uplink channel to be:

$$\hat{\beta}_k = \frac{\sum_{i=1}^{J} p_k^H Y_i^H Y_i p_k - MJ\|p_k\|^2}{MJ\|p_k\|^4} \quad (5)$$

Figure 7B:
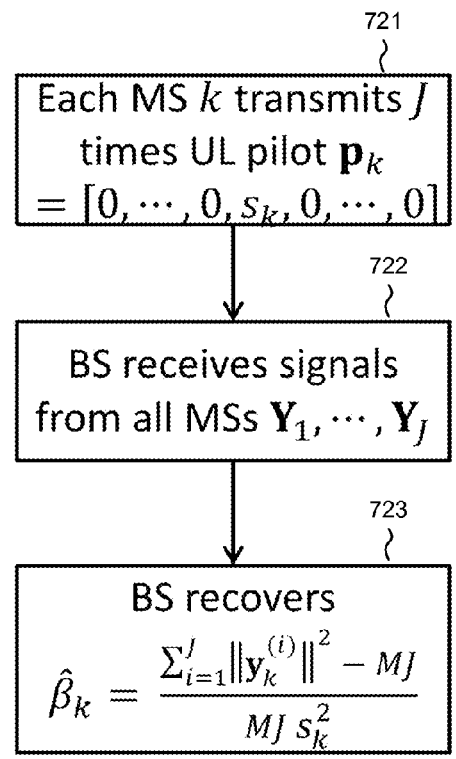
FIG. 7B is a flow chart of an uplink LSFC estimator that individually estimates the LSFC for each MS using a row of a diagonal matrix as pilot with multiple pilot transmissions in a massive MIMO system.

FIG. 7B is a flow chart of an uplink LSFC estimator that individually estimates the LSFC for each MS using a row of a diagonal matrix as pilot with multiple pilot transmissions in a massive MIMO system 200 of FIG. 2. In step 721, each MS k transmits assigned UL pilot $p_k$ J times. In the example of FIG. 7B, the pilot is chosen to be a row of diagonal matrix, i.e., P=Diag($s_1, \ldots, s_K$), where each pilot sequence $p_k=[0, \ldots, 0, s_k, 0, \ldots 0]$. In step 722, for each of the $i^{th}$ pilot transmission, the BS receives pilot signals from all K MSs, denoted as $Y_i$, where $Y_i=[y_1^{(i)}, \ldots, y_K^{(i)}]$. In step 723, the BS decouples the LSFC estimator $\hat{\beta}_k$ for each uplink channel to be:

$$\hat{\beta}_k = \frac{\sum_{i=1}^{J} \|y_k^{(i)}\|^2 - MJ}{MJ s_k^2} \quad (6)$$

While the diagonal pilots give lower computational burden, the requirement that an MS needs to transmit all pilot power in a time slot to achieve the same performance shows a risk of disobeying the maximum user output power constraint. The decision of a suitable uplink pilot pattern is a trade-off between the computational complexity and maximum user output power. In one alternative example, a Hadamard matrix is adopted as the pilot pattern. A Hadamard matrix is a square matrix whose rows or columns are mutually orthogonal and of ±1 entries. It is conjectured that a Hadamard matrix or rows of it as the pilot matrix P, the computation effort can be reduced significantly due to the fact that the calculation of $Yp_k$ in equation (2) or $Y_i p_k$ in equation (5) involves only column additions and subtractions of $Y/Y_i$.

Figure 8:
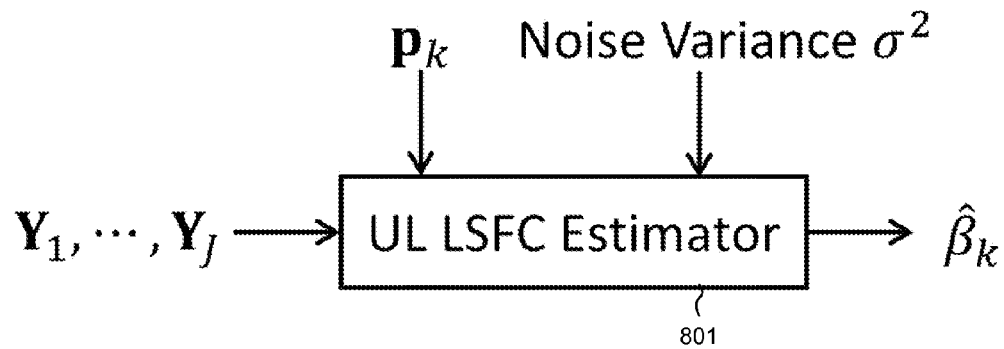
FIG. 8 shows an exemplary schematic view of an uplink LSFC estimator with multiple pilot transmissions in a massive MIMO system.

FIG. 8 shows an exemplary schematic view of an uplink LSFC estimator 801 with multiple pilot transmissions in a massive MIMO system 200 of FIG. 2. In the example of FIG. 8, a base station BS having M antennas receives radio signal $Y_1, \ldots, Y_J$ from K mobile stations MSs, each MS k transmits a pilot sequence $p_k$ J times, and the noise variance is $\sigma^2$. The UL LSFC estimator 801 is able to derive the LSFC $\hat{\beta}_k$ for each uplink channel with low computational complexity and without prior knowledge of the small-scale fading coefficients.

Figure 9:
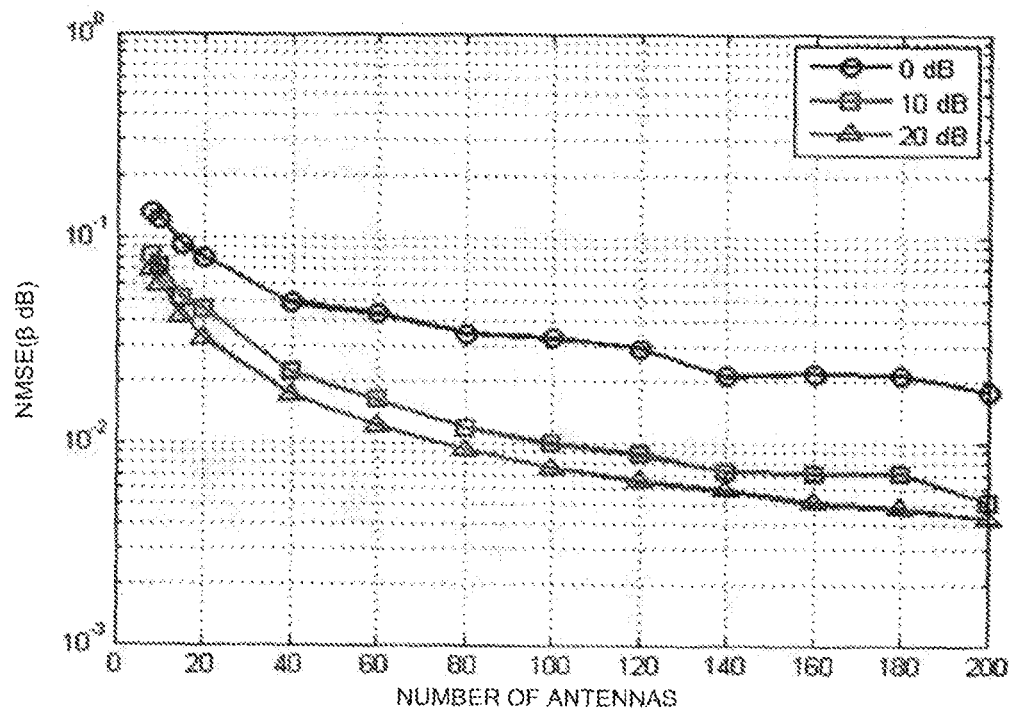
FIG. 9 shows the MSE performance with respect to BS antenna number and SNR of the proposed uplink LSFC estimator without SSFC knowledge using only one training block.

FIG. 9 shows the MSE performance with respect to BS antenna number and SNR of the proposed uplink LSFC estimator without SSFC knowledge using only one training block (J=1). As shown in FIG. 9, the MSE performance improves as the number of antenna M increases, and as the SNR increases.

Figure 10:
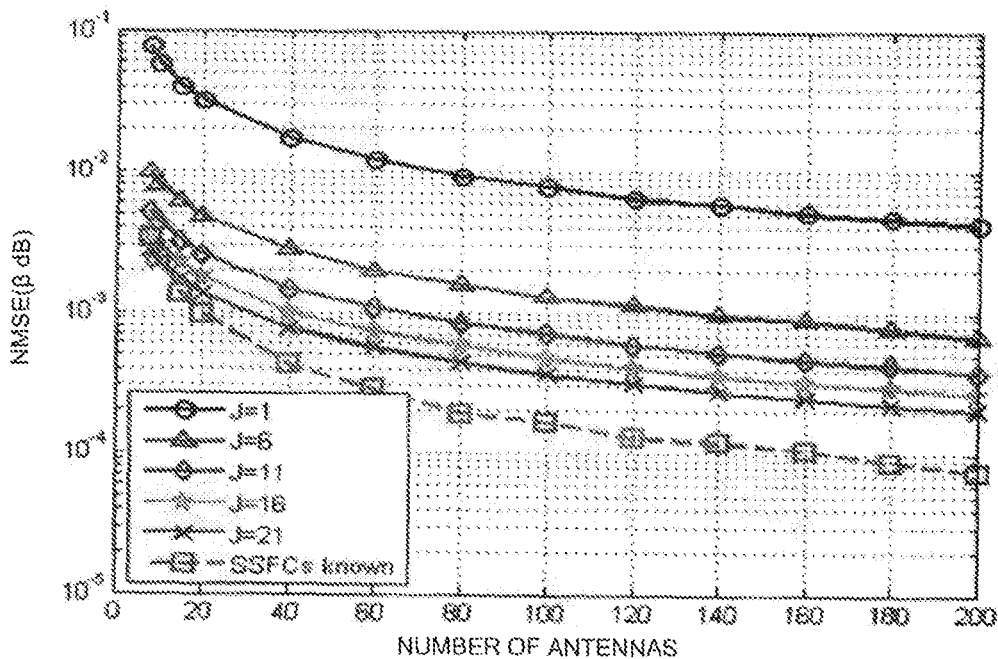
FIG. 10 shows the MSE performance with respect to BS antenna number and SNR of the conventional single-block uplink LSFC estimator with perfect SSFC knowledge and the proposed uplink LSFC estimator without SSFC knowledge using multiple training blocks.

FIG. 10 shows the MSE performance with respect to BS antenna number and SNR of the conventional single-block uplink LSFC estimator with perfect SSFC knowledge and the proposed uplink LSFC estimator without SSFC knowledge using multiple training blocks. As shown in FIG. 10, the MSE performance of the conventional single-block uplink LSFC estimator with perfect SSFC knowledge is the best, as depicted by the dashed-line. However, the MSE performance of the proposed uplink LSFC estimator without SSFC knowledge improves as the number of antenna M increases, and as the number of training blocks J increases. Furthermore, the configuration of massive MIMO makes the estimator robust against noise.

Figure 11:
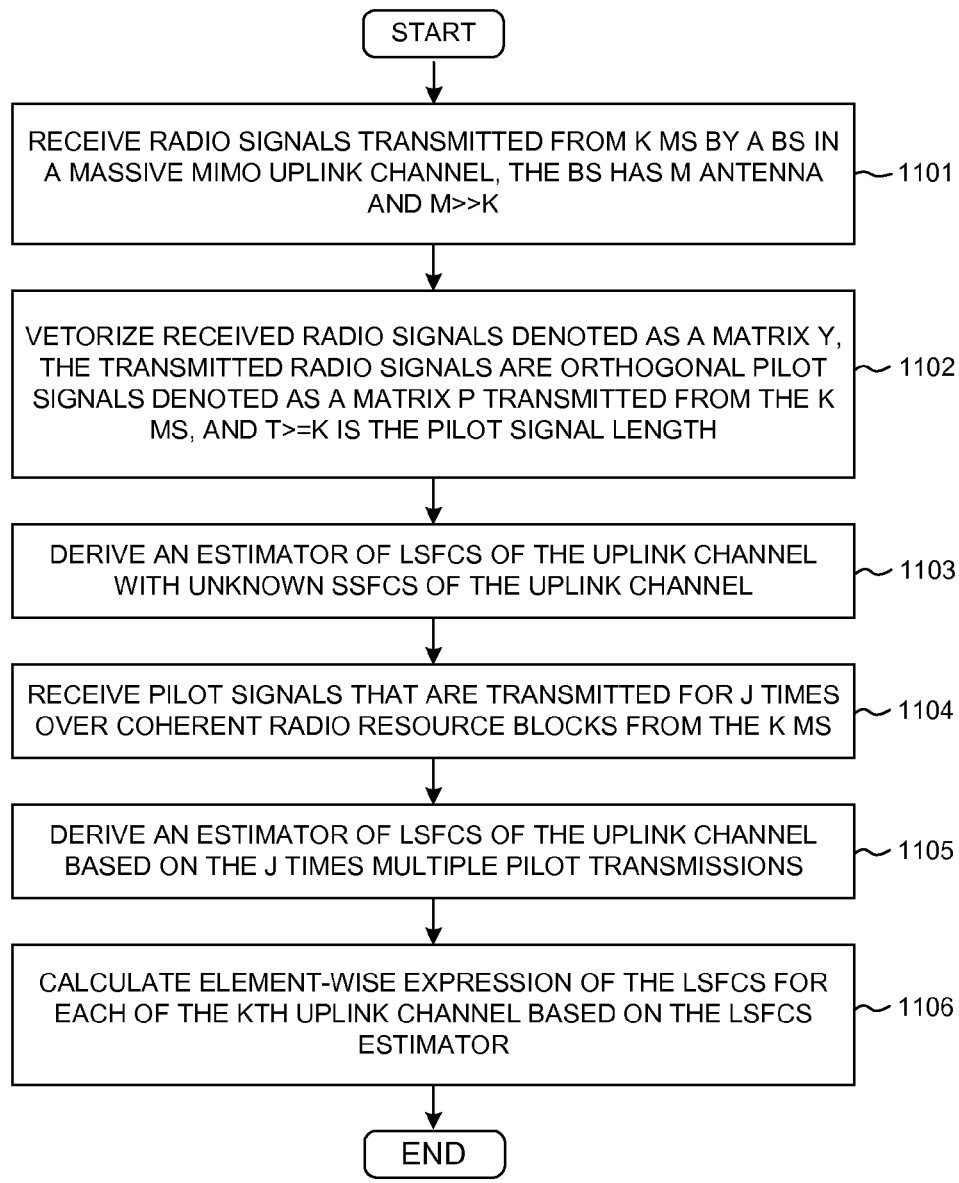
FIG. 11 is a flow chart of a method of estimating uplink LSFC in accordance with one novel aspect.

FIG. 11 is a flow chart of a method of estimating uplink LSFC in accordance with one novel aspect. In step 1101, a base station (BS) receives radio signals transmitted from K mobile stations (MSs) in a massive MIMO uplink channel where M>>K. In step 1102, the BS vectorizes the received radio signals denoted as a matrix $Y \in \mathbb{C}^{M \times T}$, the transmitted radio signals are orthogonal pilot signals denoted as a matrix $P \in \mathbb{C}^{K \times T}$ transmitted from the K MSs, and T≥K is the pilot signal length. In step 1103, the BS derives an estimator of large-scale fading coefficients (LSFCs) of the uplink channel without knowing small-scale fading coefficients (SSFCs) of the uplink channel. In step 1104, the BS receives pilot signals that are transmitted for J times over coherent radio resource blocks from the K MS. In step 1105, the BS derives a more accurate estimator of the LSFCs of the uplink channel based on the multiple pilot transmissions. In step 1106, the BS calculates element-wise expression of the LSFCs for each of the kth uplink channel based on the LSFCs estimator.

Figure 12:
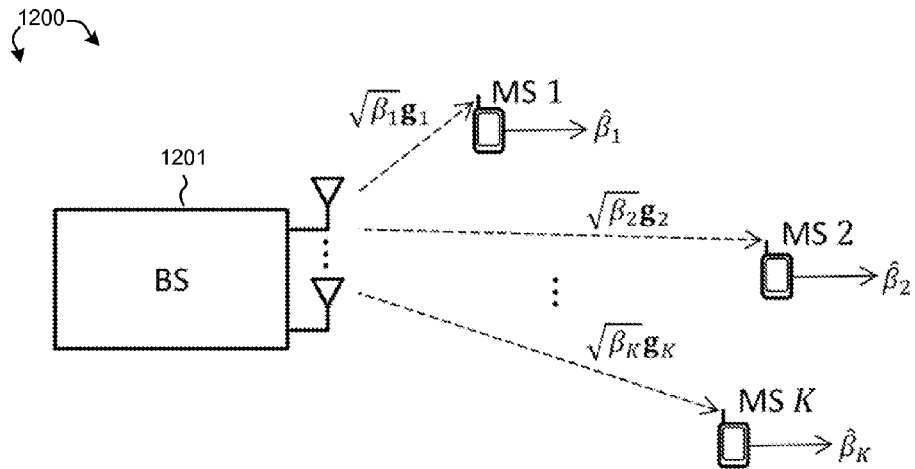
FIG. 12 is an exemplary diagram illustrating a downlink MIMO system in accordance with one novel aspect.

FIG. 12 is an exemplary diagram illustrating a downlink MIMO system 1200 in accordance with one novel aspect. MIMO system 1200 comprises a base station BS 1201 having M antennas, and K mobile stations MS 1 to MS K. In the downlink direction, BS 1201 transmits downlink packets via some or all of its M antennas to be received by some or all of the K MSs. We assume a narrowband communication environment in which a transmitted signal suffers from both large-scale and small-scale fading. The large-scale fading coefficients (LSFCs) for each downlink channel is denoted as $\beta_k$'s, while the small-scale fading coefficients (SSFCs) for each downlink channel is denoted as $g_k$'s. The length-T downlink packets of different BS antennas are placed at the same time-frequency locations so that, without loss of generality, the corresponding received samples, arranged in matrix form, $X^H = [x_1, \ldots, x_K]^H$ at MSs can be expressed as $$X^H = [x_1, \ldots, x_K]^H = D_\beta^{1/2} G^H Q + Z^H$$

where
- $G = [g_1, \ldots, g_K] \in \mathbb{C}^{M \times K}$ contains the SSFCs that characterize the K downlink channels, $g_k = \Phi_k^{1/2} \tilde{g}_k$, $\tilde{g}_k \sim CN(0_M, I_M)$, where $\Phi_k$ is the spatial correlation matrix at the BS side with respect to the $k^{th}$ user
- $D_\beta = \text{Diag}(\beta_1, \ldots, \beta_K)$ contains the LSFCs that characterize the K downlink channels, vector $\beta = [\beta_1, \ldots, \beta_K]^T$ whose elements $\beta_k = s_k d_k^{-\alpha}$ describes the shadowing effect, parameterized by independent identically distributed (i.i.d) $s_k$'s with $\log_{10}(s_k) \sim N(0, \sigma_s^2)$, and the pathloss which depends on the distance between the BS and MS $d_k$, with $\alpha > 0$
- $Q = [q_1, \ldots, q_T] \in \mathbb{C}^{M \times T}$ is a M×T matrix where T≤M, which can be a pilot matrix containing orthogonal columns $q_i^H q_j = 0$, $\forall i \neq j$ or a data matrix intended to serving different MSs
- $Z = [z_{ij}]$, $z_{ij} \sim CN(0,1)$ is the noise matrix whose entries are distributed according to CN(0,1).

We invoke the assumption that independent users are relatively far apart (with respect to the wavelength) and the $k^{th}$ downlink channel vector is independent of the $l^{th}$ vector, $\forall l \neq k$. We assume that $\tilde{g}_k$ are i.i.d. and the SSFC G remains constant during a pilot/data sequence period, i.e., the channel's coherence time is greater than T, while the LSFC $\beta$ varies much slower. In accordance with one novel aspect, several accurate LSFC estimators for downlink massive MIMO without the prior knowledge of SSFC are proposed. By exploiting the properties of massive MIMO, it has low computational complexity.

Figure 13:
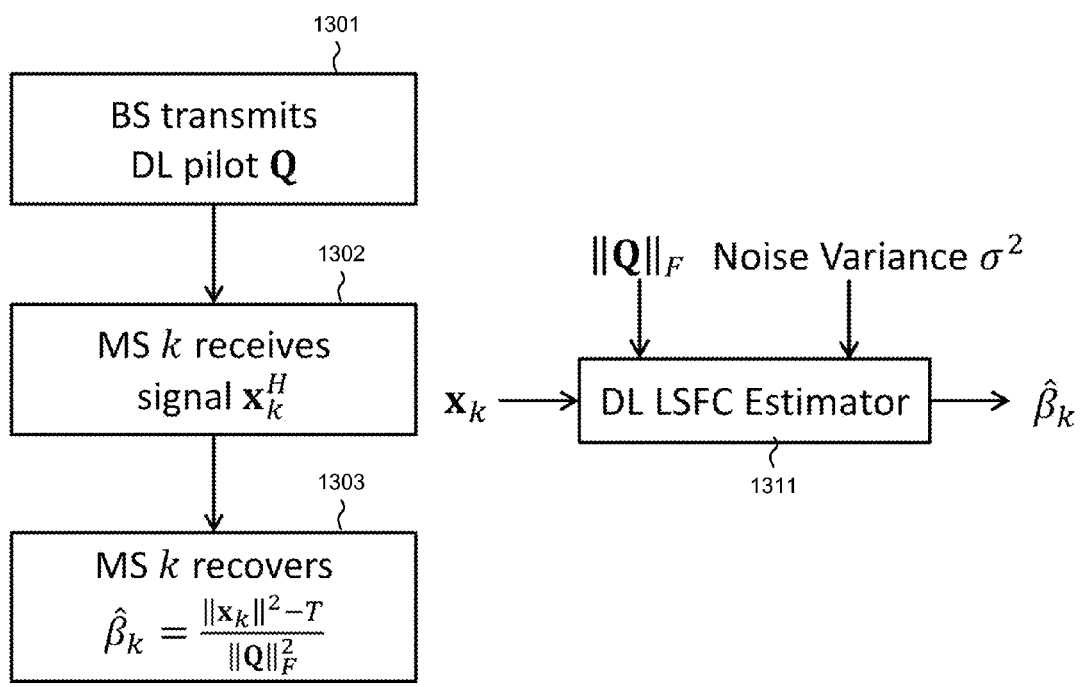
FIG. 13 is a flow chart and schematic view of a downlink semi-blind LSFC estimator that resides at each MS and estimates the LSFC of the MS using a semi-unitary matrix as pilot in a massive MIMO system.

FIG. 13 is a flow chart and schematic view of a downlink semi-blind LSFC estimator 1311 that resides at each MS and estimates the LSFC of the MS using a semi-unitary matrix as pilot in a massive MIMO system 1200 of FIG. 12. In step 1301, the BS transmits downlink pilot Q to the K MSs. In step 1302, the $k^{th}$ MS receives signal $x_k^H$. In step 1303, the $k^{th}$ MS recovers the LSFC $\hat{\beta}_k$ for each downlink channel to be:

$$\hat{\beta}_k = \frac{\|x_k\|^2 - T}{\|Q\|_F^2} \quad (7)$$

where Q is a semi-unitary matrix and MS knows nothing but pilot power $\|Q\|_F^2$.

In the embodiment of FIG. 13, let Q be a pilot matrix of the following form with $$q_t = \sqrt{P} [0_{1 \times (M-Tr+r)}, u_{1t}, 0_{1 \times (R-1)}, u_{2t}, 0_{1 \times (R-1)}, \ldots, u_{Tt}, 0_{1 \times (R-r-1)}]^T$$

where $R = \lfloor M/T \rfloor$, $r \leq R - 1$ $U = [u_{ij}]$ is unitary matrix $QQ^H = P \cdot \text{Diag}(0_{1 \times (M-TR+r)}, 1, 0_{1 \times (R-1)}, 1, 0_{1 \times (R-1)}, \ldots, 1, 0_{1 \times (R-r-1)})$ $Q^H Q = P \cdot I_T$ $\|x_k\|^2 \approx \beta_k g_k^H Q Q^H g_k + \|z_k\|^2 \xrightarrow{a.s.} \beta_k P \cdot T + T$ if $T \gg 1$.

In the example of FIG. 13, each $k^{th}$ MS receives radio signal $x_k$ from a BS having M antennas. The BS transmits a pilot signal denoted by matrix Q, which is a semi-unitary matrix. The pilot power is $\|Q\|_F^2$, and the noise variance is $\sigma^2$. The DL LSFC estimator 1311 is able to derive an estimate of the LSFC $\hat{\beta}_k$ for each downlink channel with low computational complexity and without prior knowledge of the small-scale fading coefficients. Because in a massive MIMO system, M≥T>>1 gives $$z_k^H Q^H g_k \xrightarrow{a.s.} 0,$$

if T→∞, and $\|x_k\|^2 \approx \beta_k g_k^H Q Q_H g_k + \|z_k\|^2$. In addition, $$\beta_k g_k^H Q Q^H g_k + \|z_k\|^2 \xrightarrow{a.s.} \beta_k P \cdot T + T$$

is because $$g_k^H QQ^H g_k = P \sum_{i=1}^{T} |g_{M-(T-i+1)R+r+1,k}|^2 \xrightarrow{a.s.} PT.$$

$E\{|g_{ik}|^2\}=PT$ if $T\to\infty$.

Figure 14:
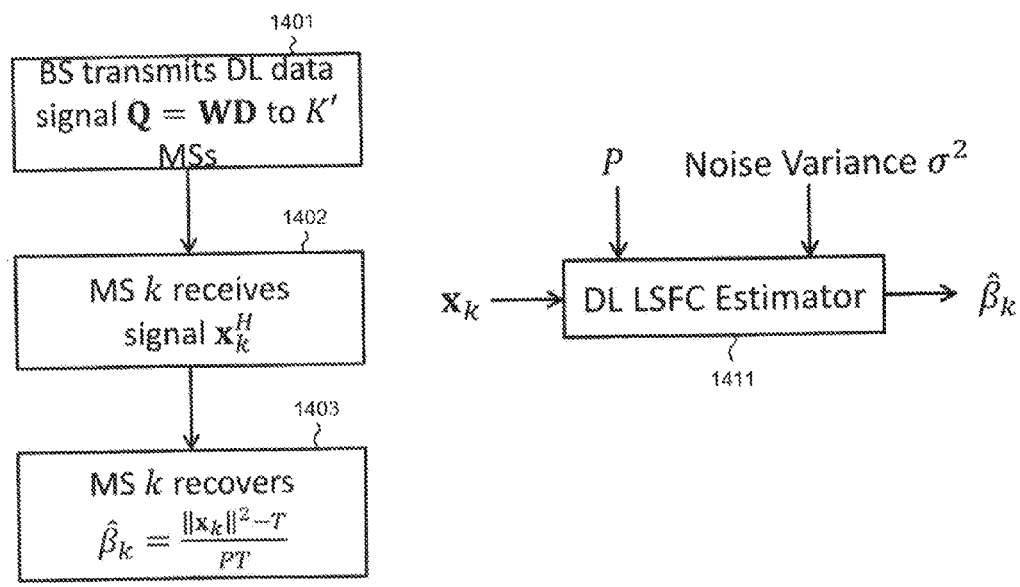
FIG. 14 is a flow chart and schematic view of a downlink blind LSFC estimator that resides at each MS and estimates the LSFC of the MS exploiting only the statistics of the unknown broadcast signal in a massive MIMO system.

FIG. 14 is a flow chart and schematic view of a downlink blind LSFC estimator 1411 that resides at each MS and estimates the LSFC of the MS exploiting only the statistics of the unknown broadcast signal in a massive MIMO system 1200 of FIG. 12. In step 1401, the BS transmits downlink data signal Q=WD to a plurality of K' MSs excluding MS 1 to K. In step 1402, the $k^{th}$ MS receives signal $x_k^H$. In step 1403, the $k^{th}$ MS recovers the LSFC $\hat{\beta}_k$ for each downlink channel to be:

$$\hat{\beta}_k = \frac{\|x_k\|^2 - T}{PT} \quad (8)$$

where each MS using only statistics of unknown broadcast signal to estimate $\hat{\beta}_k$.

In the embodiment of FIG. 14,

Q=WD where
- $D=[d_1, \ldots, d_T]\in\mathbb{C}^{K'\times T}$: Data entries of D are unknown i.i.d. information intended to K' serving MSs excluding MS 1 to K. The power of D entries is P/K'
- $W=[w_1, \ldots, w_{K'}]\in\mathbb{C}^{M\times K'}$: Unknown beamforming or precoding matrix, having unit-norm columns, to those K' serving MSs, and $w_i^H w_j = \delta_{ij}$ $$\|x_k\|^2 \approx \beta_k g_k^H QQ^H g_k + \|z_k\|^2$$
$$= \beta_k \tilde{g}_k^H \Phi_k^{\frac{1}{2}} QQ^H \Phi_k^{\frac{1}{2}} \tilde{g}_k + \|z_k\|^2 \xrightarrow{a.s.} \beta_k tr(\Phi_k^{\frac{1}{2}} QQ^H \Phi_k^{\frac{1}{2}}) + T$$
$$= \beta_k tr(\Phi_k^{1/2} WDD^H W^H \Phi_k^{1/2}) + T -$$
$$tr(\Phi_k^{1/2} WDD^H W^H \Phi_k^{1/2})$$
$$= tr(D^H W^H \Phi_k WD)$$
$$\stackrel{def}{=} tr(D^H AD)$$
$$= tr\left(\begin{bmatrix} d_1^H A d_1 & \cdots & d_1^H A d_T \\ \vdots & \ddots & \vdots \\ d_T^H A d_1 & \cdots & d_T^H A d_T \end{bmatrix}\right) \xrightarrow{a.s.} \frac{P}{K'} tr\left(\begin{bmatrix} trA & \cdots & 0 \\ \vdots & \ddots & \vdots \\ 0 & \cdots & trA \end{bmatrix}\right)$$
$$= \frac{PT}{K'} trA$$
$$= \frac{PT}{K'} tr\left(\begin{bmatrix} w_1^H \Phi_k w_1 & \cdots & w_1^H \Phi_k w_{K'} \\ \vdots & \ddots & \vdots \\ w_{K'}^H \Phi_k w_1 & \cdots & w_{K'}^H \Phi_k w_{K'} \end{bmatrix}\right) \xrightarrow{a.s.}$$
$$\frac{PT}{K'M} tr\left(\begin{bmatrix} tr\Phi_k & \cdots & 0 \\ \vdots & \ddots & \vdots \\ 0 & \cdots & tr\Phi_k \end{bmatrix}\right)$$
$$= PT$$

In the example of FIG. 14, each $k^{th}$ MS receives radio signal $x_k$ from a BS having M antennas. The BS transmits a pilot signal denoted by matrix Q=WD, the power is P, and the noise variance is $\sigma^2$. The DL LSFC estimator 1411 is able to derive the LSFC $\hat{\beta}_k$ for each downlink channel with low computational complexity and without prior knowledge of the small-scale fading coefficients. Note that when N>>1, two independent random vectors $u,v \in \mathbb{C}^{N\times 1}$ has two properties: i)

$$u^H A u - tr(A) \xrightarrow{a.s.} 0$$

and ii)

$$\frac{1}{M} u^H A v \xrightarrow{a.s.} 0.$$

Thus, with large dimensions of $\tilde{g}_k$'s, $d_i$'s, $$w_i's, \tilde{g}_k^H \Phi_k^{\frac{1}{2}} QQ^H \Phi_k^{\frac{1}{2}} \tilde{g}_k \xrightarrow{a.s.} tr(\Phi_k^{\frac{1}{2}} QQ^H \Phi_k^{\frac{1}{2}}), \frac{K'}{P} d_i^H A d_j \xrightarrow{a.s.} trA \cdot \delta_{ij},$$

and $$M \cdot w_i^H \Phi_k w_j \xrightarrow{a.s.} tr\Phi_k \cdot \delta_{ij}.$$

Figure 15A:
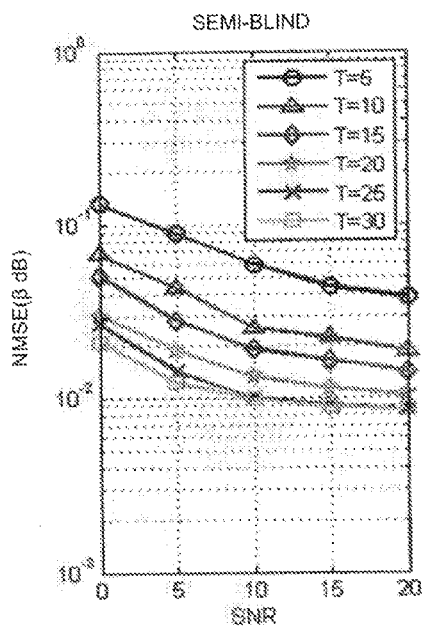
FIG. 15A-15B show the MSE performance with respect to SNR and training period of the proposed downlink LSFC estimators without SSFC knowledge.

FIG. 15A shows the MSE performance with respect to SNR and training period of the proposed downlink semi-blind LSFC estimators without SSFC knowledge. As shown in FIG. 15A, the MSE performance improves as the SNR increases, and as the training period T increases.

Figure 15B:
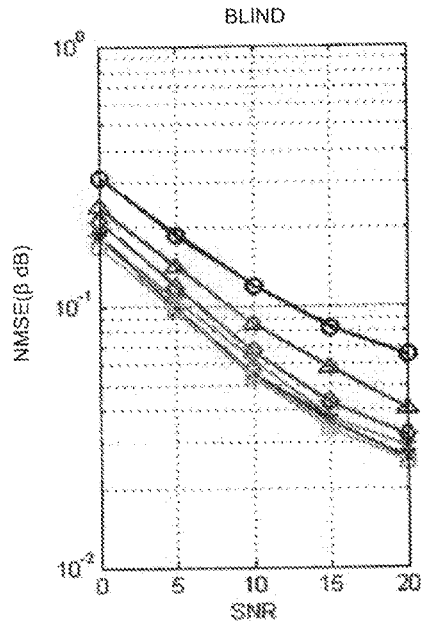

FIG. 15B shows the MSE performance with respect to SNR and training period of the proposed downlink blind LSFC estimators without SSFC knowledge. As shown in FIG. 15B, the MSE performance improves as the SNR increases, and as the training period T increases.

Figure 16:
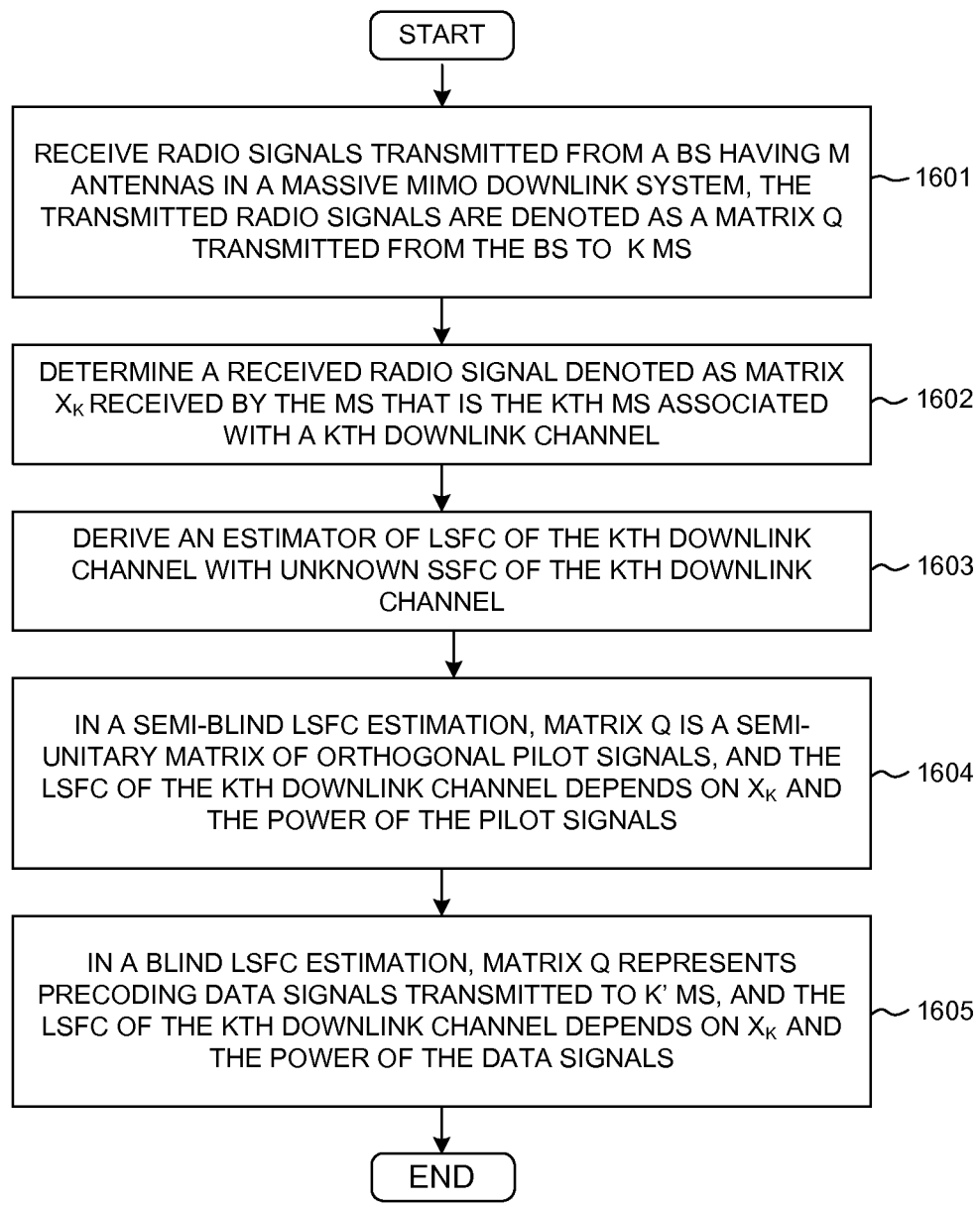
FIG. 16 is a flow chart of a method of estimating downlink LSFC in accordance with one novel aspect.

FIG. 16 is a flow chart of a method of estimating downlink LSFC in accordance with one novel aspect. In step 1601, a mobile station (MS) receives radio signals transmitted from a base station (BS) having M antennas in a massive MIMO system. The transmitted radio signals are denoted as a matrix Q transmitted from the BS to K MS. In step 1602, the MS determines a received radio signal denoted as a vector $x_k$ received by the MS that is the kth MS associated with a $k^{th}$ downlink channel. In step 1603, the $k^{th}$ MS derives an estimator of a large-scale fading coefficient (LSFC) of the $k^{th}$ downlink channel without knowing a small-scale fading coefficient (SSFC) of the kth downlink channel. In step 1604, in a semi-blind LSFC estimation, matrix Q is a semi-unitary matrix consisting of orthogonal pilot signals, and the LSFC of the $k^{th}$ downlink channel is derived based on $x_k$ and the transmitting power of the pilot signals. In step 1605, in a blind LSFC estimation, matrix Q represents pre-coded data signals transmitted to K' MS that are different from the K MS. The LSFC of the $k^{th}$ downlink channel is derived based on $x_k$ and the transmitting power of the data signals with unknown data information and unknown beamforming or precoding information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving radio signals transmitted from K mobile stations (MSs) by a base station (BS) in a massive multiple input and multiple output (MIMO) uplink channel, wherein the BS has M antennas, and wherein M>>K;
   vectorizing received radio signals denoted as a matrix $Y \in \mathbb{C}^{M \times T}$, wherein the transmitted radio signals are orthogonal pilot signals denoted as a matrix $P \in \mathbb{C}^{K \times T}$ transmitted from the K MSs, and wherein T≥K is the pilot signal length; and
   deriving an estimator of large-scale fading coefficients (LSFCs) of the uplink channel with unknown small-scale fading coefficients (SSFCs) of the uplink channel, wherein the pilot signals are denoted as $P=[p_1, \ldots, p_K]^H$, $p_k$ represents a $k^{th}$ pilot signal from a $k^{th}$ MS to the BS via a $k^{th}$ uplink channel, and wherein the LSFCs are derived to be $$\hat{\beta} = \text{Diag}(\|p_1\|^{-4}, \ldots, \|p_K\|^{-4}) \cdot ((1_T^T \otimes P) \odot (P^* \otimes 1_T^T)) \cdot \text{vec}\left(\frac{1}{M} Y^H Y - I_T\right).$$

2. The method of claim 1, wherein the LSFCs are derived without iterative approach and without performing matrix inversion.

3. The method of claim 1, wherein the LSFCs are denoted as $\hat{\beta} = [\hat{\beta}_1, \ldots, \hat{\beta}_K]$, and wherein element-wise expressions render $$\hat{\beta}_k = \frac{p_k^H Y^H Y p_k - M \|p_k\|^2}{M \|p_k\|^4}$$

for the $k^{th}$ uplink channel.

4. The method of claim 1, wherein the pilot signals are transmitted for J times over coherent radio resource blocks, and wherein the LSFCs are derived to be $$\hat{\beta} = \text{Diag}(\|p_1\|^{-4}, \ldots, \|p_K\|^{-4}) \cdot$$
$$((1_T^T \otimes P) \odot (P^* \otimes 1_T^T)) \cdot \text{vec}\left(\frac{1}{MJ} \sum_{i=1}^{J} Y_i^H Y_i - \frac{1}{J} I_T\right),$$

where the received signals $Y_i$ represents the $i^{th}$ received radio signals at the BS.

5. The method of claim 4, wherein the LSFCs are denoted as $\hat{\beta} = [\hat{\beta}_1, \ldots, \hat{\beta}_K]$, and wherein element-wise expressions render $$\hat{\beta}_k = \frac{\sum_{i=1}^{J} p_k^H Y_i^H Y_i p_k - MJ \|p_k\|^2}{MJ \|p_k\|^4}$$

for the $k^{th}$ uplink channel.

6. The method of claim 4, wherein the pilot signals for different transmissions of the J times are different.

7. The method of claim 1, wherein the pilot signals P is a diagonal matrix and T=K.

8. The method of claim 1, wherein the pilot signals P is a Hadamard matrix and T=K, wherein each of the rows or columns of P are mutually orthogonal and of ±1 entries.

9. A method, comprising:
   receiving radio signals transmitted from a base station (BS) having M antennas by a mobile station (MS) in a massive multiple input and multiple output (MIMO) downlink system, wherein the transmitted radio signals are denoted as a matrix Q transmitted from the BS to a plurality of K MSs, wherein matrix Q forms a semi-unitary matrix $Q=[q_1, \ldots, q_T] \in \mathbb{C}^{M \times T}$ of orthogonal pilot signals, wherein T is the length of each pilot signal and T≤M, and wherein the pilot signals have a transmitting power of $\|Q\|_F^2$;
   determining a received radio signal denoted as vector $x_k^H$ received by the MS that is the $k^{th}$ MS associated with a $k^{th}$ downlink channel; and
   deriving an estimator of large-scale fading coefficients (LSFC) of the $k^{th}$ downlink channel with unknown small-scale fading coefficient (SSFC) of the $k^{th}$ downlink channel.

10. The method of claim 9, wherein the LSFC is derived without iterative approach and without performing matrix inversion.

11. The method of claim 9, wherein the LSFC for the $k^{th}$ downlink channel is derived to be $$\hat{\beta}_k = \frac{\|x_k\|^2 - T}{\|Q\|_F^2}.$$

12. A method, comprising:
    receiving radio signals transmitted from a base station (BS) having M antennas by a mobile station (MS) in a massive multiple input and multiple output (MIMO) downlink system, wherein the transmitted radio signals are denoted as a matrix Q transmitted from the BS to a plurality of K MSs, wherein matrix Q represents precoding data signals transmitted to another plurality of K' MSs that are different from the K MSs;
    determining a received radio signal denoted as vector $x_k^H$ received by the MS that is the $k^{th}$ MS associated with a $k^{th}$ downlink channel; and
    deriving an estimator of large-scale fading coefficients (LSFC) of the $k^{th}$ downlink channel with unknown small-scale fading coefficient (SSFC) of the $k^{th}$ downlink channel.

13. The method of claim 12, wherein matrix Q=WD, wherein $W \in \mathbb{C}^{M \times K'}$ represents an unknown precoding matrix and $D \in \mathbb{C}^{K' \times T}$ represents unknown data information intended to the K' MSs, and wherein T is the data signal length and 1<<T≤M.

14. The method of claim 13, wherein the LSFC for the kth downlink channel is derived to be $$\hat{\beta}_k = \frac{\|x_k\|^2 - T}{PT},$$

wherein P represents a transmit power of the precoding data signals.

15. A mobile station (MS), comprising:
    a receiver that receives radio signals transmitted from a base station (BS) having M antennas in a massive multiple input and multiple output (MIMO) downlink system, wherein the transmitted radio signals are denoted as a matrix Q transmitted from the BS to a plurality of K MSs, and wherein a received radio signal denoted as vector $x_k^H$ is received by the MS that is the $k^{th}$ MS associated with a $k^{th}$ downlink channel, wherein matrix Q forms a semi-unitary matrix $Q=[q_1, \ldots, q_T] \in \mathbb{C}^{M \times T}$ of orthogonal pilot signals, wherein T is the length of each pilot signal and $1 \ll T \leq M$, and wherein the pilot signals have a transmitting power of $\|Q\|_F^2$; and a channel estimation module that derives an estimator of large-scale fading coefficients (LSFC) of the $k^{th}$ downlink channel with unknown small-scale fading coefficient (SSFC) of the $k^{th}$ downlink channel.

16. The MS of claim 15, wherein the LSFC is derived without iterative approach and without performing matrix inversion.

17. The MS of claim 15, wherein the LSFC for the $k^{th}$ downlink channel is derived to be $$\hat{\beta}_k = \frac{\|x_k\|^2 - T}{\|Q\|_F^2}.$$

18. A mobile station (MS), comprising:
a receiver that receives radio signals transmitted from a base station (BS) having M antennas in a massive multiple input and multiple output (MIMO) downlink system, wherein the transmitted radio signals are denoted as a matrix Q transmitted from the BS to a plurality of K MSs, and wherein a received radio signal denoted as vector $x_k^H$ is received by the MS that is the $k^{th}$ MS associated with a $k^{th}$ downlink channel, wherein matrix Q represents precoding data signals transmitted to another plurality of K' MSs that are different from the K MSs; and a channel estimation module that derives an estimator of large-scale fading coefficients (LSFC) of the $k^{th}$ downlink channel with unknown small-scale fading coefficient (SSFC) of the $k^{th}$ downlink channel.

19. The MS of claim 18, wherein matrix Q=WD, wherein $W \in \mathbb{C}^{M \times K'}$ represents an unknown precoding matrix and $D \in \mathbb{C}^{K' \times T}$ represents unknown data information intended to the K' MSs, and wherein T is the data signal length and $1 \ll T \leq M$.

20. The MS of claim 19, wherein the LSFC for the $k^{th}$ downlink channel is derived to be $$\hat{\beta}_k = \frac{\|x_k\|^2 - T}{PT},$$

wherein P represents a transmit power of the precoding data signals.

* * * * *

UNITED STATES PATENT AND TRADEMARK OFFICE
CERTIFICATE OF CORRECTION

PATENT NO. : 9,647,734 B2
APPLICATION NO. : 14/539212
DATED : May 9, 2017
INVENTOR(S) : Yen-Cheng Liu et al.

Page 1 of 1

It is certified that error appears in the above-identified patent and that said Letters Patent is hereby corrected as shown below:

In the Claims

Column 13, Lines 11, the word "$\mathbf{Y} \in \in^{M \times T}$" should be "$\mathbf{Y} \in \mathbb{C}^{M \times T}$"

Column 13, Lines 12, the word "$\mathbf{P} \in \in^{K \times T}$" should be "$\mathbf{P} \in \mathbb{C}^{K \times T}$"

Column 14, Lines 11, the word "$\in \in^{M \times T}$" should be "$\in \mathbb{C}^{M \times T}$"

Column 14, Lines 50, the word "$\mathbf{W} \in \in^{M \times K'}$" should be "$\mathbf{W} \in \mathbb{C}^{M \times K'}$"

Column 14, Lines 51, the word "$\mathbf{D} \in \in^{K' \times T}$" should be "$\mathbf{D} \in \mathbb{C}^{K' \times T}$"

Column 15, Lines 7, the word "$\in \in^{M \times T}$" should be "$\in \mathbb{C}^{M \times T}$"

Column 16, Lines 14, the word "$\mathbf{W} \in \in^{M \times K'}$" should be "$\mathbf{W} \in \mathbb{C}^{M \times K'}$"

Column 16, Lines 15, the word "$\mathbf{D} \in \in^{K' \times T}$" should be "$\mathbf{D} \in \mathbb{C}^{K' \times T}$"

Signed and Sealed this
Twentieth Day of February, 2018

Andrei Iancu
*Director of the United States Patent and Trademark Office*